US012656720B2

(12) United States Patent
Kusano et al.

(10) Patent No.: US 12,656,720 B2
(45) Date of Patent: Jun. 16, 2026

(54) IMAGE FORMING APPARATUS

(71) Applicant: FUJIFILM Business Innovation Corp., Tokyo (JP)

(72) Inventors: Keisuke Kusano, Kanagawa (JP); Kosuke Narita, Kanagawa (JP); Daisuke Tano, Kanagawa (JP); Tomoya Sasaki, Kanagawa (JP); Yoshiteru Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/058,025

(22) Filed: Feb. 20, 2025

(65) Prior Publication Data

US 2026/0086492 A1 Mar. 26, 2026

(30) Foreign Application Priority Data

Sep. 25, 2024 (JP) ................................ 2024-166634

(51) Int. Cl.
*G03G 21/00* (2006.01)
*G03G 5/05* (2006.01)
(Continued)

(52) U.S. Cl.
CPC ....... *G03G 21/0017* (2013.01); *G03G 5/0507* (2013.01); *G03G 5/0546* (2013.01);
(Continued)

(58) Field of Classification Search
CPC .. G03G 15/75; G03G 15/751; G03G 21/0011; G03G 21/0017; G03G 21/1814;
(Continued)

(56) References Cited

U.S. PATENT DOCUMENTS 8,889,325 B2 11/2014 Konishi et al.
9,031,491 B2 5/2015 Asano et al.
(Continued)

FOREIGN PATENT DOCUMENTS

JP 2003140373 5/2003
JP 2013214037 10/2013
(Continued)

OTHER PUBLICATIONS

"Search Report of Europe Counterpart Application", issued on Jul. 18, 2025, p. 1-p. 9.

*Primary Examiner* — Joseph S Wong

(57) ABSTRACT

An image forming apparatus includes a photoreceptor that has a surface layer in which a transmittance of light having a wavelength of 1,000 nm is 5% or more and 95% or less, a charging device that charges a surface of the photoreceptor, an electrostatic latent image forming device that forms an electrostatic latent image on the charged surface of the photoreceptor, a developing device that develops the electrostatic latent image formed on the surface of the photoreceptor with a developer containing a toner to form a toner image, a transfer device that transfers the toner image to a surface of a recording medium, and a photoreceptor cleaning device that has a cleaning blade coming into contact with the surface of the photoreceptor to clean the surface of the photoreceptor, in which a contact portion of the cleaning blade coming into contact with the photoreceptor contains a polyurethane rubber that is obtained by polymerizing at least a polyol component and a polyisocyanate component, a ratio M100/Re of a 100% modulus M100 (MPa) to an impact resilience coefficient Re (%) is 0.25 or more, the impact resilience coefficient Re is less than 25%, and a tensile stress with a 200% strain at a temperature of 23° C. is 15 MPa or more.

12 Claims, 4 Drawing Sheets

(51) Int. Cl.
*G03G 15/00* (2006.01)
*G03G 21/18* (2006.01)

(52) U.S. Cl.
CPC ........... *G03G 15/75* (2013.01); *G03G 15/751* (2013.01); *G03G 21/0011* (2013.01); *G03G 21/1814* (2013.01); *G03G 2221/1606* (2013.01)

(58) Field of Classification Search
CPC ............... G03G 5/0507; G03G 5/0546; G03G 2221/1606
See application file for complete search history.

(56) References Cited

U.S. PATENT DOCUMENTS

| | | | | |
|---|---|---|---|---|
| 9,146,523 | B2 | 9/2015 | Kabata et al. | |
| 11,892,780 | B1 | 2/2024 | Yamada et al. | |
| 2013/0251401 | A1 | 9/2013 | Asano et al. | |
| 2015/0177674 | A1* | 6/2015 | Tano | G03G 21/0017 399/350 |
| 2019/0235437 | A1* | 8/2019 | Hagimoto | G03G 21/0029 |
| 2020/0292969 | A1 | 9/2020 | Sekiya et al. | |
| 2022/0404758 | A1* | 12/2022 | Sasaki | G03G 15/5058 |
| 2023/0229106 | A1 | 7/2023 | Oshima et al. | |

FOREIGN PATENT DOCUMENTS

| | | |
|---|---|---|
| JP | 2014002364 | 1/2014 |
| JP | 2014085622 | 5/2014 |
| JP | 6032545 | 11/2016 |
| JP | 6066287 | 1/2017 |
| JP | 2019164322 | 9/2019 |
| JP | 2022170536 | 11/2022 |
| JP | 2023144988 | 10/2023 |
| JP | 2024027443 | 3/2024 |

* cited by examiner

IMAGE FORMING APPARATUS

CROSS-REFERENCE TO RELATED APPLICATIONS

This application is based on and claims priority under 35 USC 119 from Japanese Patent Application No. 2024-166634 filed Sep. 25, 2024.

BACKGROUND

(i) Technical Field

The present disclosure relates to an image forming apparatus.

(ii) Related Art

JP2014-085622A discloses a cleaning device including an elastic blade that comes into contact with an object to be cleaned in a counter direction and removes an adherent attached to a surface of the object to be cleaned, in which a proportion of a fluorine element in a case where a tip surface that is an end surface of the elastic blade in a longitudinal direction of the elastic blade is measured by X-ray photoelectron spectroscopy is 16.3 atomic % or more.

JP2013-214037A discloses an image forming apparatus including a photoreceptor and a cleaning blade having a distal end ridge portion that abuts onto a surface of the photoreceptor, in which the photoreceptor has a crosslinked resin surface layer consisting of an acrylic and/or methacrylic resin, and the distal end ridge portion of the cleaning blade has a laminated configuration of a base material consisting of an elastomer, a mixed layer of the base material and an acrylic and/or methacrylic resin, and a surface consisting of an acrylic and/or methacrylic resin layer.

JP2024-027443A discloses an image forming apparatus including a cleaning blade in which a 100% modulus at a temperature of 23° C. is 17 MPa or more and 23 MPa or less.

JP2022-170536A discloses an electrophotographic photoreceptor having a surface layer containing fluorine atom-containing resin fine particles.

JP2019-164322A discloses an electrophotographic photoreceptor having a protective layer containing aluminum-doped zinc oxide particles.

JP2014-002364A discloses an electrophotographic photoreceptor having a protective layer containing silica particles.

SUMMARY

Aspects of non-limiting embodiments of the present disclosure relate to an image forming apparatus that suppresses fluctuation in image density for a long period of time and is unlikely to cause streak-like image defects.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific methods for achieving the above-described object include the following.

According to an aspect of the present disclosure, there is provided an image forming apparatus including:

a photoreceptor that has a surface layer in which a transmittance of light having a wavelength of 1,000 nm is 5% or more and 95% or less;

a charging device that charges a surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image;

a transfer device that transfers the toner image to a surface of a recording medium; and a photoreceptor cleaning device that has a cleaning blade coming into contact with the surface of the photoreceptor to clean the surface of the photoreceptor, in which a contact portion of the cleaning blade coming into contact with the photoreceptor contains a polyurethane rubber that is obtained by polymerizing at least a polyol component and a polyisocyanate component, a ratio M100/Re of a 100% modulus M100 (MPa) to an impact resilience coefficient Re (%) is 0.25 or more, the impact resilience coefficient Re is less than 25%, and a tensile stress with a 200% strain at a temperature of 23° C. is 15 MPa or more.

BRIEF DESCRIPTION OF THE DRAWINGS

Exemplary embodiment(s) of the present invention will be described in detail based on the following figures, wherein.

DETAILED DESCRIPTION

Figure 1:
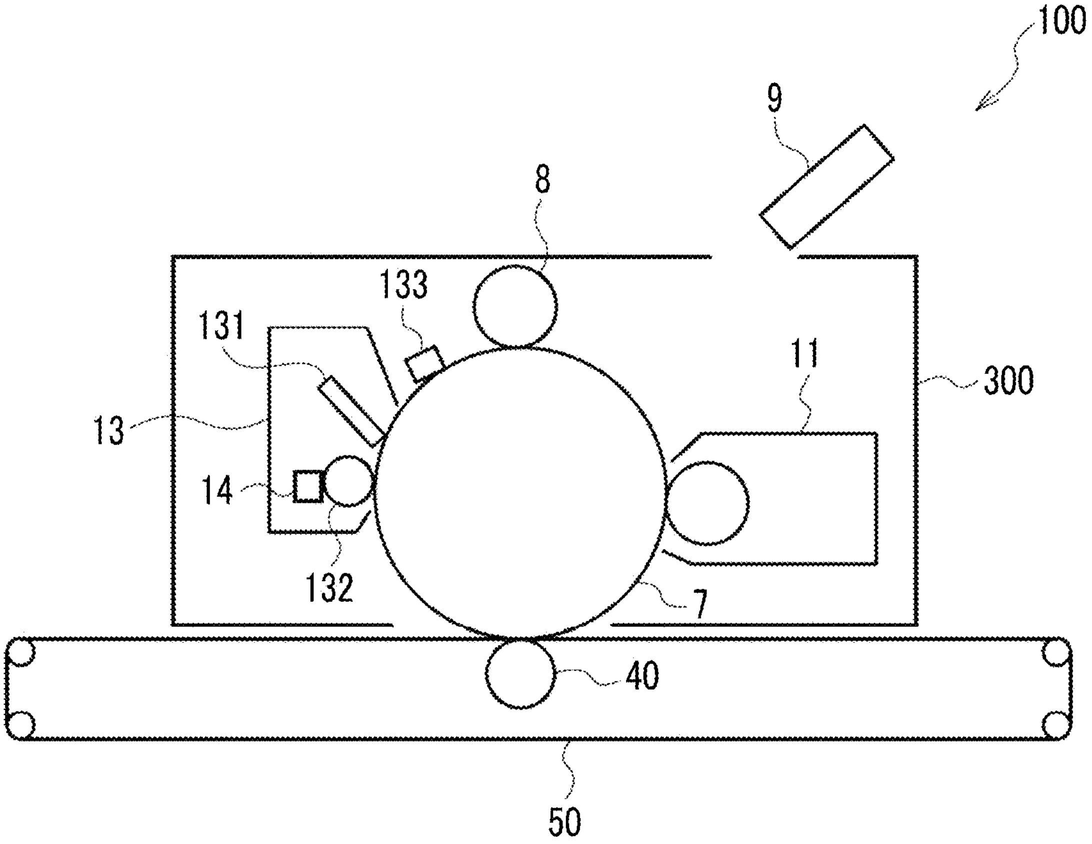
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a numerical range described using "to" represents a range including numerical values listed before and after "to" as the minimum value and the maximum value respectively.

Regarding the numerical ranges described in stages in the present disclosure, the upper limit or lower limit of a numerical range may be replaced with the upper limit or lower limit of another numerical range described in stages. Furthermore, in the present disclosure, the upper limit or lower limit of a numerical range may be replaced with values described in examples.

In the present disclosure, the term "step" includes not only an independent step but a step that is not clearly distinguished from other steps as long as the purpose of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, an alkyl group and an alkylene group are any of linear, branched, or cyclic, unless otherwise specified.

In the present disclosure, a hydrogen atom in an organic group, an aromatic ring, a linking group, an alkyl group, an alkylene group, an aryl group, an aralkyl group, an alkoxy group, an aryloxy group, and the like may be substituted with a halogen atom.

In the present disclosure, in a case where a compound is represented by a structural formula, the compound may be represented by a structural formula in which symbols representing a carbon atom and a hydrogen atom (C and H) in a hydrocarbon group and/or a hydrocarbon chain are omitted.

In the present disclosure, "photoreceptor" refers to "electrophotographic photoreceptor".

In the present disclosure, "axial direction" of the photoreceptor means a direction in which a rotation axis of the photoreceptor extends, and "circumferential direction" of the photoreceptor means a rotation direction of the photoreceptor.

Image Forming Apparatus

The image forming apparatus according to the present exemplary embodiment includes a photoreceptor that has a surface layer in which a transmittance of light having a wavelength of 1,000 nm is 5% or more and 95% or less, a charging device that charges a surface of the photoreceptor, an electrostatic latent image forming device that forms an electrostatic latent image on the charged surface of the photoreceptor, a developing device that develops the electrostatic latent image formed on the surface of the photoreceptor with a developer containing a toner to form a toner image, a transfer device that transfers the toner image to a surface of a recording medium, and a photoreceptor cleaning device that has a cleaning blade coming into contact with the surface of the photoreceptor to clean the surface of the photoreceptor.

The transmittance of the surface layer of the photoreceptor to light having a wavelength of 1,000 nm being 5% or more and 95% or less means that the surface layer contains at least one filler particle selected from the group consisting of organic particles and inorganic particles, and the surface layer is a relatively hard layer. By containing the filler particles, a hardness of the surface layer is increased, and abrasion resistance of the photoreceptor is improved.

In the present exemplary embodiment, the transmittance of the surface layer of the photoreceptor to light having a wavelength of 1,000 nm is a value measured by the following measuring method.

A sample of the surface layer, obtained by scraping off the surface layer from the photoreceptor, is attached to a glass plate. The transmittance is measured using an ultraviolet-visible spectrophotometer (UV2600, Shimadzu Corporation). The wavelength is set to 1,000 nm in the transmittance measurement mode, and the measured value is read.

The transmittance of the surface layer of the photoreceptor to light having a wavelength of 1,000 nm can be controlled by incorporating an appropriate amount of the filler particles into the surface layer. The filler particles may be organic particles or inorganic particles, or a mixture of organic particles and inorganic particles may be used.

In the cleaning blade of the image forming apparatus according to the present exemplary embodiment, a contact portion of the cleaning blade coming into contact with the photoreceptor contains a polyurethane rubber that is obtained by polymerizing at least a polyol component and a polyisocyanate component, a ratio M100/Re of a 100% modulus M100 (MPa) to an impact resilience coefficient Re (%) is 0.25 or more, the impact resilience coefficient Re is less than 25%, and a tensile stress with a 200% strain at a temperature of 23° C. is 15 MPa or more.

The cleaning blade may have a single layer structure of only a member (hereinafter, referred to as "contact member") constituting the contact portion having the above-described characteristics, a two-layer structure of a first layer consisting of the contact member and a second layer supporting the first layer, or a structure consisting of three or more layers. The cleaning blade may have a structure in which only the contact portion coming into contact with the photoreceptor is made of a material having the above-described characteristics and a periphery thereof is made of another material.

In the image forming apparatus according to the present exemplary embodiment, a fluctuation in image density (a decrease in image density or an increase in image density) for a long period of time is suppressed, and it is difficult for streak-like image defects to occur. The mechanism is considered as follows.

In order to extend the life of the photoreceptor, it is advisable to provide a relatively hard surface layer to improve abrasion resistance. In a case where the abrasion of surface layer of the photoreceptor is suppressed, electrical properties of the photoreceptor are maintained, and image density is unlikely to fluctuate for a long period of time.

However, in a case where the abrasion resistance of the surface layer is excellent, refreshing of an outer peripheral surface of the photoreceptor is suppressed, a toner component adheres to the outer peripheral surface of the photoreceptor, filming (formation of a coating) occurs, and the image density may fluctuate. In order to suppress the filming on the outer peripheral surface of the photoreceptor, for example, it is preferable to harden at least a portion of a cleaning blade that comes into contact with the outer peripheral surface of the photoreceptor to refresh the outer peripheral surface of the photoreceptor.

However, in a case where both the photoreceptor and the cleaning blade are hard, the shape of both members is difficult to follow particles (that is, toner particles and external additive particles remaining on the photoreceptor without being transferred) collected in the contact portion between both members, and thus the particles (particularly, the external additive particles having a relatively small particle diameter) slip through the cleaning blade. The particles that have slipped through the cleaning blade generate streak-like image defects.

In the image forming apparatus according to the present exemplary embodiment, the cleaning blade is controlled to have physical properties such that the cleaning blade is repulsive to stress while the contact portion with the photoreceptor is hardened in order to ensure the durability of the cleaning blade, and thus the fluctuation in image density is suppressed for a long period of time and it is difficult for the streak-like image defects to occur. The cleaning blade cleans the photoreceptor by bringing the contact portion having high hardness into contact with the outer peripheral surface of the photoreceptor. In this manner, the filming on the outer peripheral surface of the photoreceptor is suppressed, and the fluctuation in image density is suppressed. The cleaning blade is highly repulsive to stress, so that the cleaning blade easily follows the shape of the particles present on the outer peripheral surface of the photoreceptor, the particles are suppressed from slipping out, and as a result, the streak-like image defects are unlikely to occur.

In the present disclosure, the 100% modulus, the impact resilience coefficient, and the tensile stress of the cleaning blade are values measured by the following measuring methods using the contact member as a sample.

The 100% modulus is obtained from a stress at 100% strain, that is measured using a dumbbell-shaped No. 3 test piece in accordance with JIS K 6251: 2010 at a temperature of 23° C. and a tensile speed of 500 mm/min. Strograph AE Elastomer (Toyo Seiki-Seisaku-syo, Ltd.) is used as a measuring device.

The impact resilience coefficient is measured using a Lupke rebound resilience tester in an environment of a temperature of 23° C. in accordance with JIS K6255: 1996.

The tensile stress is a tensile stress with a 200% strain measured at a temperature of 23° C. The measurement is performed at a tensile speed of 500 mm/min using a dumbbell-shaped No. 3 test piece. Strograph AE Elastomer (Toyo Seiki-Seisaku-syo, Ltd.) is used as a measuring device.

Hereinafter, a configuration of the image forming apparatus according to the present exemplary embodiment will be described in detail.

The image forming apparatus according to the present exemplary embodiment includes a photoreceptor, a charging device, an electrostatic latent image forming device, a developing device, a transfer device, and a photoreceptor cleaning device.

The image forming apparatus according to the present exemplary embodiment may further include a fixing device that fixes the toner image transferred to the surface of the recording medium, a static elimination device that removes charges by irradiating the surface of the photoreceptor after the transfer of the toner image and before the charging with charge removing light, and the like.

In the image forming apparatus according to the present exemplary embodiment, a portion including the photoreceptor may have a cartridge structure (process cartridge) that is attachable to and detachable from the image forming apparatus.

The image forming apparatus according to the present exemplary embodiment may be a direct transfer-type image forming apparatus that directly transfers a toner image formed on the surface of the photoreceptor to a recording medium; or an intermediate transfer-type image forming apparatus that primarily transfers the toner image formed on the surface of the photoreceptor to the surface of an intermediate transfer member and secondarily transfers the toner image transferred to the surface of the intermediate transfer member to the surface of the recording medium. In the intermediate transfer-type apparatus, the transfer device has an intermediate transfer member with surface on which the toner image will be transferred, a primary transfer device that performs primary transfer to transfer the toner image formed on the surface of the photoreceptor to the surface of the intermediate transfer member, and a secondary transfer device that performs secondary transfer to transfer the toner image transferred to the surface of the intermediate transfer member to the surface of a recording medium.

An example of the image forming apparatus according to the present exemplary embodiment will be shown below, but the present invention is not limited thereto. Among the parts shown in the drawing, main parts will be described, and others will not be described.

FIG. 1 is a view schematically showing a configuration of an example of the image forming apparatus according to the present exemplary embodiment.

As shown in FIG. 1, an image forming apparatus 100 according to the present exemplary embodiment includes a process cartridge 300 including a photoreceptor 7, an exposure device 9 (an example of the electrostatic latent image forming device), a transfer device 40 (primary transfer device), and an intermediate transfer member 50. In the image forming apparatus 100, the exposure device 9 is disposed at a position that can be exposed to the photoreceptor 7 from an opening portion of the process cartridge 300; the transfer device 40 is disposed at a position that faces the photoreceptor 7 through the intermediate transfer member 50; and the intermediate transfer member 50 is disposed such that a part of the intermediate transfer member 50 is in contact with the photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer device.

The process cartridge 300 in FIG. 1 integrally supports the photoreceptor 7, a charging device 8 (an example of the charging device), a developing device 11 (an example of the developing device), and a cleaning device 13 (an example of the photoreceptor cleaning device) in a housing. The cleaning device 13 has a cleaning blade (an example of a cleaning member) 131, and the cleaning blade 131 is disposed to come into contact with the surface of the photoreceptor 7.

FIG. 1 shows an example of an image forming apparatus including a fibrous member 132 (roll shape) that supplies a lubricant 14 to the surface of the photoreceptor 7 and a fibrous member 133 (flat brush shape) that assists the cleaning, but these are disposed as necessary.

Figure 2:
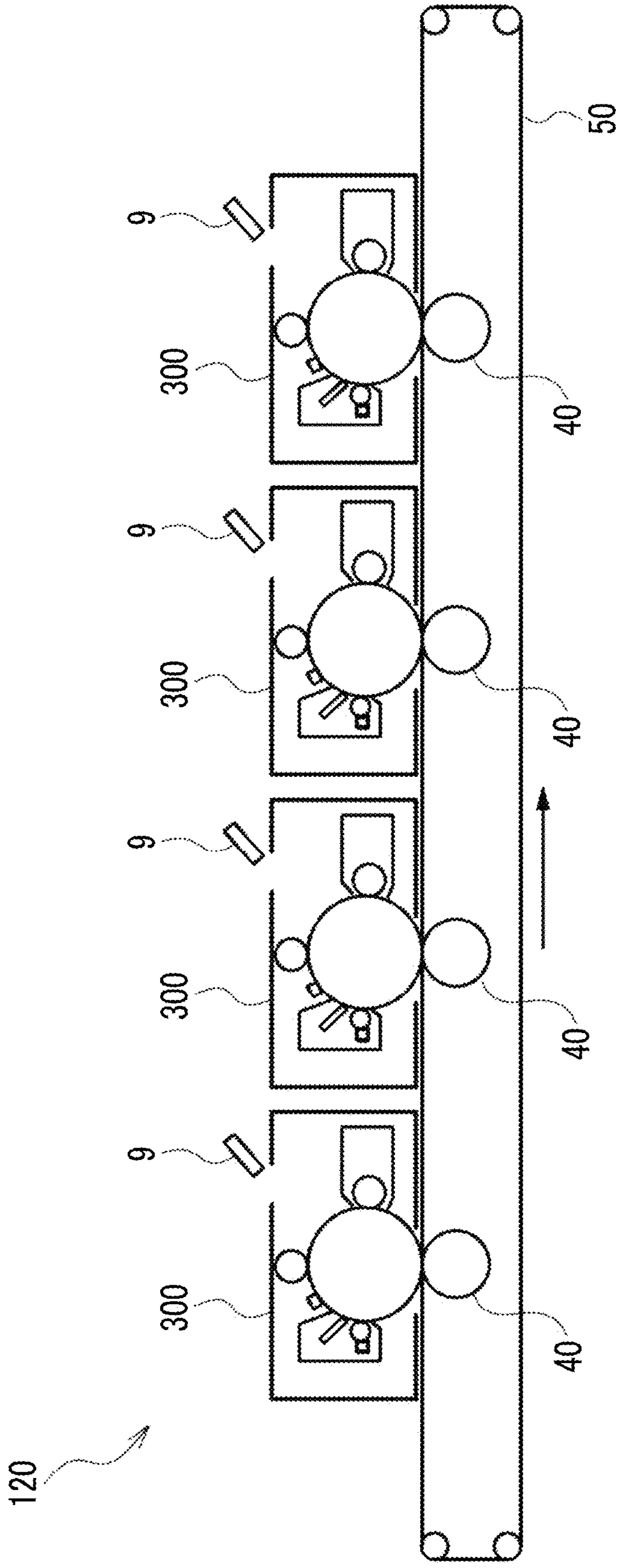
FIG. 2 is a view schematically showing a configuration of another example of the image forming apparatus according to the present exemplary embodiment.

FIG. 2 is a view schematically showing a configuration of another example of the image forming apparatus according to the present exemplary embodiment.

An image forming apparatus 120 shown in FIG. 2 is a tandem type multicolor image forming apparatus in which four process cartridges 300 are mounted. The image forming apparatus 120 is formed such that the four process cartridges 300 are arranged in parallel on the intermediate transfer member 50, and one photoreceptor is used for each color. The image forming apparatus 120 has the same configuration as the image forming apparatus 100, except that the image forming apparatus 120 is of a tandem type.

Hereinafter, each configuration of the image forming apparatus according to the present exemplary embodiment will be described.

Photoreceptor

The photoreceptor 7 has, for example, a conductive substrate, a photosensitive layer disposed on the conductive substrate, and a surface layer disposed on the photosensitive layer. The photosensitive layer may be a lamination-type photosensitive layer consisting of a charge generation layer and a charge transporting layer, or may be a single layer-type photosensitive layer. Details of the photoreceptor will be described later.

Charging Device

As the charging device 8, for example, a contact-type charger formed of a conductive or semi-conductive charging roller, a charging brush, a charging film, a charging rubber blade, a charging tube, or the like is used. As the charging device 8, for example, a known charger such as a non-contact type roller charger, and a scorotron charger or a corotron charger using corona discharge is also used.

Exposure Device

Examples of the exposure device 9 include an optical system device that exposes the surface of the photoreceptor 7 to light such as a semiconductor laser beam, LED light, and liquid crystal shutter light in a predetermined image pattern. A wavelength of the light source is set to be within a spectral sensitivity region of the photoreceptor. As a wavelength of a semiconductor laser, near infrared laser, which has an oscillation wavelength in the vicinity of 780 nm, is mostly used. However, the wavelength is not limited thereto, and a laser having an oscillation wavelength of an approximately 600 nm level or a laser having an oscillation wavelength of 400 nm or more and 450 nm or less as a blue laser may also be used. In addition, a surface emission-type laser light source capable of outputting a multi-beam is also effective for forming a color image.

Developing Device

Examples of the developing device 11 include a typical developing device that performs development in contact or non-contact with the developer. The developing device 11 is not particularly limited as long as the device has the above-described functions, and is selected depending on the purpose thereof. Examples thereof include known developing machines having a function of attaching a one-component developer or a two-component developer to the photoreceptor 7 using a brush, a roller, or the like. Among the above, for example, a developing roller in which a developer is retained on a surface is preferably used.

The developer used in the developing device 11 may be a one-component developer containing only a toner or a two-component developer containing a toner and a carrier. The developer may be magnetic or non-magnetic. The toner generally contains toner particles and an external additive that is externally added to the toner particles.

Photoreceptor Cleaning Device

As the cleaning device 13, a cleaning blade-type device including the cleaning blade 131 is used. Details of the cleaning blade will be described later.

Transfer Device

Examples of the transfer device 40 include a known transfer charger such as a contact type transfer charger using a belt, a roller, a film, a rubber blade, or the like, and a scorotron transfer charger or a corotron transfer charger using corona discharge.

Intermediate Transfer Member

As the intermediate transfer member 50, a semi-conductive belt-like intermediate transfer member (intermediate transfer belt) containing polyimide, polyamide-imide, polycarbonate, polyarylate, polyester, rubber, or the like is used. As the form of the intermediate transfer member, a drum-like intermediate transfer member may be used in addition to the belt-like intermediate transfer member.

An operation of forming an image by the image forming apparatus 100 shown in FIG. 1 will be described.

The photoreceptor 7 rotates at a predetermined speed.

The charging device 8 charges the surface of the photoreceptor 7.

For example, a laser beam is emitted from the exposure device 9 to the charged surface of the photoreceptor 7, and an electrostatic latent image is formed on the surface of the photoreceptor 7.

The electrostatic latent image formed on the photoreceptor 7 moves to a developing position as the photoreceptor 7 rotates. At the developing position, the electrostatic latent image on the photoreceptor 7 is developed and visualized by the developing device 11 as a toner image.

The toner image formed on the photoreceptor 7 moves to a primary transfer position as the photoreceptor 7 rotates. At the primary transfer position, a transfer bias is applied to the transfer device 40, an electrostatic force from the photoreceptor 7 toward the transfer device 40 acts on the toner image on the photoreceptor 7, and the toner image is transferred to the intermediate transfer member 50.

The intermediate transfer member 50 travels at a predetermined speed, and the toner image is transferred to the recording medium by the secondary transfer device at a secondary transfer position.

The toner remaining on the surface of the photoreceptor 7 is removed and collected by the cleaning device 13.

Hereinafter, the configuration of the photoreceptor included in the image forming apparatus according to the present exemplary embodiment will be described in detail. In addition, the cleaning blade of the photoreceptor cleaning device included in the image forming apparatus according to the present exemplary embodiment will be described in detail. In addition, the toner and the developer used in the developing device included in the image forming apparatus according to the present exemplary embodiment will be described in detail.

Photoreceptor

An exemplary embodiment of the photoreceptor will be described with reference to FIGS. 3 and 4.

Figure 3:
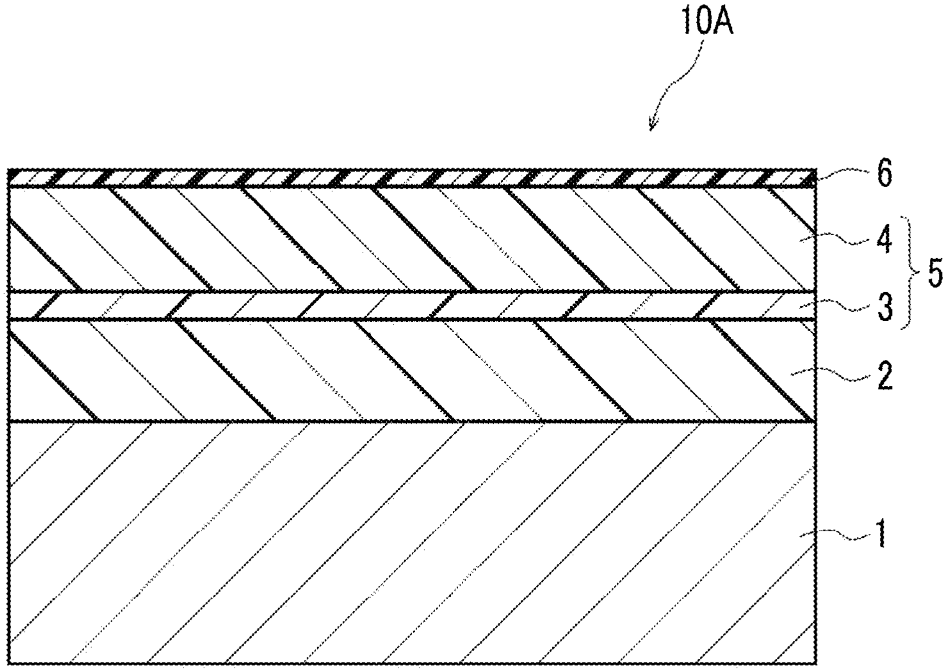
FIG. 3 is a partial cross-sectional view showing an example of a layer configuration of a photoreceptor according to the present exemplary embodiment.

FIG. 3 is a partial cross-sectional view schematically showing an example of a layer configuration of the photoreceptor. A photoreceptor 10A shown in FIG. 3 has a structure in which an undercoat layer 2, a charge generation layer 3, a charge transport layer 4, and a surface layer 6 are laminated in this order on a conductive substrate 1, and the charge generation layer 3 and the charge transport layer 4 constitute a photosensitive layer 5. In the photoreceptor 10A, the surface layer 6 is disposed to be in contact with the charge transport layer 4. The photoreceptor 10A may include an interlayer (not shown) between the undercoat layer 2 and the charge generation layer 3. The undercoat layer 2 may or may not be provided.

Figure 4:
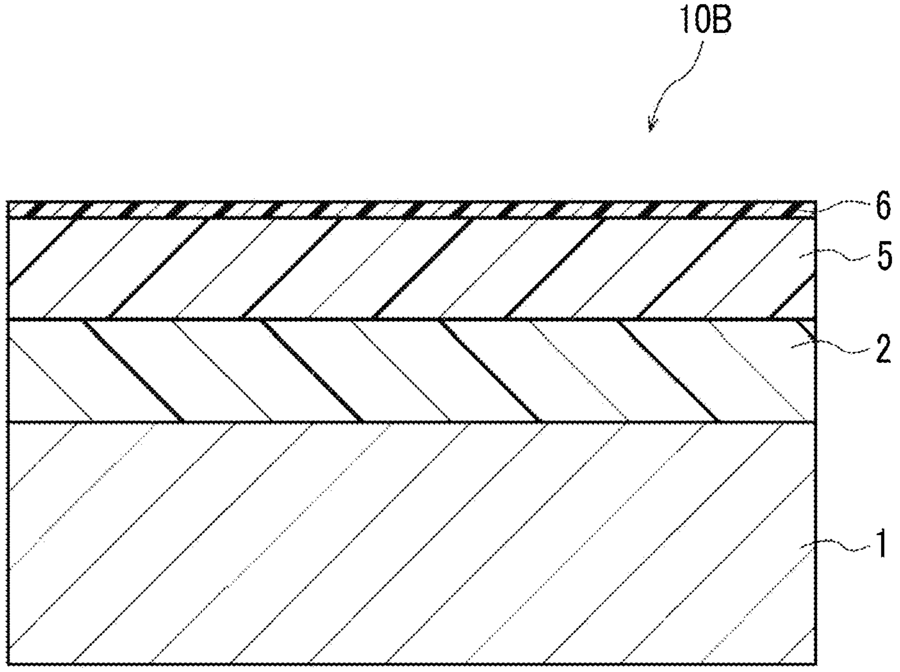
FIG. 4 is a partial cross-sectional view showing another example of the layer configuration of the photoreceptor according to the present exemplary embodiment.

FIG. 4 is a partial cross-sectional view schematically showing another example of the layer configuration of the photoreceptor. A photoreceptor 10B shown in FIG. 4 has a structure in which an undercoat layer 2, a single layer-type photosensitive layer 5, and the surface layer 6 are laminated in this order on a conductive substrate 1. In the photoreceptor 10B, the surface layer 6 is disposed to be in contact with the single layer-type photosensitive layer 5. The photoreceptor 10B may include an interlayer (not shown) between the undercoat layer 2 and the charge generation layer 3. The undercoat layer 2 may or may not be provided.

Surface Layer

The surface layer is provided on the photosensitive layer. The surface layer is the outermost surface layer of the photoreceptor.

From the viewpoint of increasing the hardness and improving the abrasion resistance, for example, the surface layer preferably contains at least one filler particle selected from the group consisting of organic particles and inorganic particles.

Examples of the organic particles include fluororesin particles, polystyrene resin particles, polymethyl methacrylate resin particles, and melamine resin particles. Examples of the inorganic particles include metal oxide particles and silica particles. One kind of these particles may be used alone, or two or more kinds thereof may be used in combination.

From the viewpoint of increasing the hardness, improving the abrasion resistance, and balancing the electrical properties of the surface layer, a content of the filler particles contained in the surface layer is, for example, preferably 5% by mass or more and 50% by mass or less, more preferably 8% by mass or more and 40% by mass or less, and still more preferably 10% by mass or more and 30% by mass or less with respect to the total mass of the surface layer.

For example, the surface layer preferably contains a charge transport material. Examples of the charge transport material of the surface layer include a polycyclic aromatic compound, a heterocyclic compound, a hydrazone compound, a styryl compound, an enamine compound, a benzidine compound, and a triarylamine compound.

From the viewpoint of increasing the hardness and improving the abrasion resistance, the surface layer is, for example, preferably a cured layer obtained by curing a polymerizable composition or a reactive composition.

Examples of an exemplary embodiment of the surface layer include a layer obtained by curing a composition containing a monomer having a polymerizable functional group and fluororesin particles. The monomer having a polymerizable functional group, that is contained in the composition, is polymerized to form a cured layer.

Examples of a polymerization reaction of the monomer having a polymerizable functional group include a thermal polymerization reaction, a photopolymerization reaction, and a radiation polymerization reaction.

Examples of the polymerizable functional group included in the monomer having a polymerizable functional group include an acrylic group and a methacrylic group. As the monomer having a polymerizable functional group, a material having charge transportability may be used.

A polymerization initiator may be used depending on the type of the monomer having a polymerizable functional group.

Examples of the fluororesin particles include particles of polytetrafluoroethylene, polyvinyl fluoride, polyvinylidene fluoride, polychlorotrifluoroethylene, and the like. One kind of the fluororesin particles may be used alone, or two or more kinds thereof may be used in combination.

An average primary particle size of the fluororesin particles is, for example, preferably 100 nm or more and 300 nm or less, more preferably 120 nm or more and 280 nm or less, and still more preferably 150 nm or more and 250 nm or less.

A content of the fluororesin particles contained in the surface layer is, for example, preferably 5% by mass or more and 50% by mass or less, more preferably 8% by mass or more and 40% by mass or less, and still more preferably 10% by mass or more and 30% by mass or less with respect to the total mass of the surface layer.

Examples of another exemplary embodiment of the surface layer include a cured layer obtained by curing a composition containing an ultraviolet curable acrylic resin and at least one particle selected from the group consisting of metal oxide particles and silica particles. The ultraviolet curable acrylic resin contained in the composition is cured to form a cured layer.

Examples of a reactive functional group included in the ultraviolet curable acrylic resin include an acrylic group and a methacrylic group. As the ultraviolet curable acrylic resin, for example, an acrylic resin acrylate is preferable.

Examples of the metal oxide particles include particles of tin oxide, zinc oxide, aluminum oxide, titanium oxide, indium oxide, antimony oxide, bismuth oxide, and the like. One kind of the metal oxide particles may be used alone, or two or more kinds thereof may be used in combination.

Average primary particle sizes of the metal oxide particles and the silica particles are, for example, preferably 0.1 μm or more and 2 μm or less, more preferably 0.2 μm or more and 1.5 μm or less, and still more preferably 0.3 μm or more and 1 μm or less.

A content of the metal oxide particles and the silica particles (total amount of the particles) contained in the surface layer is, for example, preferably 5% by mass or more and 50% by mass or less, more preferably 8% by mass or more and 40% by mass or less, and still more preferably 10% by mass or more and 30% by mass or less with respect to the total mass of the surface layer.

As a method of forming the surface layer, for example, a method of applying a polymerizable composition or a reactive composition onto a photosensitive layer and then heating or irradiating the polymerizable composition or the reactive composition with light to cure the polymerizable composition or the reactive composition is preferable.

Examples of the method of applying the polymerizable composition or the reactive composition onto the photosensitive layer include typical methods such as a dip coating method, a push-up coating method, a wire bar coating method, a spray coating method, a blade coating method, an air knife coating method, and a curtain coating method.

A layer thickness of the surface layer is, for example, preferably 1 μm or more and 20 μm or less, more preferably 2 μm or more and 15 μm or less, and still more preferably 3 μm or more and 10 μm or less.

Conductive Substrate

Examples of the conductive substrate include metal plates, metal drums, metal belts, or the like, containing a metal (such as aluminum, copper, zinc, chromium, nickel, molybdenum, vanadium, indium, gold, and platinum) or an alloy (such as stainless steel). In addition, examples of the conductive substrate also include paper, a resin film, a belt, or the like, that is obtained by being coated, vapor-deposited, or laminated with a conductive compound (such as a conductive polymer and indium oxide), a metal (such as aluminum, palladium, and gold) or an alloy. Here, the term "conductive" denotes that a volume resistivity is less than $1\times10^{13}$ Ω·cm.

In a case where the photoreceptor is used in a laser printer, for example, it is preferable that a surface of the conductive substrate is roughened such that a centerline average roughness Ra thereof is 0.04 μm or more and 0.5 μm or less for the purpose of suppressing interference fringes from occurring in a case of irradiation with laser beams. In a case where incoherent light is used as a light source, roughening of the surface to prevent the interference fringes is not particularly necessary, and it is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by the anodization is chemically active in a natural state, is easily contaminated, and has a large resistance fluctuation depending on the environment. Therefore, for example, it is preferable that a sealing treatment is performed on the porous anodized film so that micropores of the oxide film are closed by volume expansion due to a hydration reaction in pressurized steam or boiling water (a metal salt such as nickel may be added thereto) for a change into a more stable a hydrous oxide.

A film thickness of the anodized film is, for example, preferably 0.3 μm or more and 15 μm or less. In a case where the film thickness is within the above-described range, barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. As a blending proportion of the phosphoric acid, chromic acid, and hydrofluoric acid to the acidic treatment liquid, for example, a concentration of the phosphoric acid may be in a range of 10% by mass or more and 11% by mass or less, a concentration of the chromic acid may be in a range of 3% by mass or more and 5% by mass or less, and a concentration of the hydrofluoric acid may be in a range of 0.5% by mass or more and 2% by mass or less, and a concentration of all of these acids may be in a range of 13.5% by mass or more and 18% by mass or less. A treatment temperature is, for example, preferably 42° C. or higher and 48° C. or lower. A film thickness of the coating film is, for example, preferably 0.3 μm or more and 15 μm or less.

The boehmite treatment is carried out, for example, by dipping the base material in pure water at 90° C. or higher and 100° C. or lower for 5 minutes to 60 minutes, or by bringing the base material into contact with heated steam at 90° C. or higher and 120° C. or lower for 5 minutes to 60 minutes. A film thickness of the coating film is, for example, preferably 0.1 μm or more and 5 μm or less. The coating film may be further subjected to an anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ Ω·cm or more and $1\times10^{11}$ Ω·cm or less.

Among the above, as the inorganic particles having the above-described resistance value, for example, metal oxide particles such as tin oxide particles, titanium oxide particles, zinc oxide particles, and zirconium oxide particles may be used, and zinc oxide particles are particularly preferable.

A specific surface area of the inorganic particles, measured by a BET method, may be, for example, 10 $m^2/g$ or more.

A volume-average particle diameter of the inorganic particles may be 50 nm or more and 2,000 nm or less (for example, preferably 60 nm or more and 1,000 nm or less).

A content of the inorganic particles is, for example, preferably 10% by mass or more and 80% by mass or less, and more preferably 40% by mass or more and 80% by mass or less with respect to the binder resin.

The inorganic particles may be subjected to a surface treatment. As the inorganic particles, two or more kinds of inorganic particles subjected to different surface treatments or two or more kinds of inorganic particles having different particle diameters may be used in a form of a mixture.

Examples of a surface treatment agent include a silane coupling agent, a titanate-based coupling agent, an aluminum-based coupling agent, and a surfactant. In particular, for example, a silane coupling agent is preferable, and a silane coupling agent having an amino group is more preferable.

Examples of the silane coupling agent having an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane; but the present invention is not limited thereto.

The silane coupling agent may be used in a form of a mixture of two or more kinds thereof. For example, the silane coupling agent having an amino group and other silane coupling agents may be used in combination. Examples of the other silane coupling agents include vinyltrimethoxysilane, 3-methacryloxypropyl-tris 2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane; but the present invention is not limited thereto.

A surface treatment method using the surface treatment agent may be any method as long as the method is a known method, and any of a dry method or a wet method may be used.

A treatment amount of the surface treatment agent is, for example, preferably 0.5% by mass or more and 10% by mass or less with respect to the inorganic particles.

Here, for example, the undercoat layer may contain an electron-accepting compound (acceptor compound) together with the inorganic particles from the viewpoint of enhancing long-term stability of electrical properties and carrier blocking properties.

Examples of the electron-accepting compound include electron-transporting substances, for example, a compound having an anthraquinone structure; a quinone-based compound such as chloranil and bromanil; a tetracyanoquinodimethane-based compound; a fluorenone compound such as 2,4,7-trinitrofluorenone and 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable; and specifically, anthraquinone, alizarin, quinizarin, anthrarufin, purpurin, or a derivative thereof is preferable.

The electron-accepting compound may be contained in the undercoat layer in a state of being dispersed with the inorganic particles, or in a state of being attached to the surface of the inorganic particles.

Examples of a method of attaching the electron-accepting compound to the surface of the inorganic particles include a dry method and a wet method.

The dry method is, for example, a method of attaching the electron-accepting compound to the surface of the inorganic particles by adding the electron-accepting compound dropwise to the inorganic particles directly or by dissolving the electron-accepting compound in an organic solvent while stirring the inorganic particles with a mixer having a large shearing force and spraying the mixture together with dry air or nitrogen gas. For example, the dropwise addition or spraying of the electron-accepting compound may be performed at a temperature equal to or lower than a boiling point of the solvent. After the dropwise addition or spraying of the electron-accepting compound, the mixture may be further baked at 100° C. or higher. The baking is not particularly limited as long as the temperature and the time are adjusted such that electrophotographic characteristics can be obtained.

The wet method is, for example, a method of attaching the electron-accepting compound to the surface of the inorganic particles by adding the electron-accepting compound to inorganic particles while dispersing the inorganic particles in a solvent by performing using a stirrer, an ultrasonic disperser, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that electrophotographic characteristics can be obtained. In the wet method, the moisture contained in the inorganic particles may be removed before the electron-accepting compound is added, and examples thereof include a method of removing the moisture while stirring and heating the inorganic particles in a solvent and a method of removing the moisture by azeotropically boiling the inorganic particles with a solvent.

The electron-accepting compound may be attached before or after the inorganic particles are subjected to the surface treatment with the surface treatment agent or simultaneously with the surface treatment with the surface treatment agent.

A content of the electron-accepting compound may be, for example, 0.01% by mass or more and 20% by mass or less, preferably 0.01% by mass or more and 10% by mass or less with respect to the inorganic particles.

Examples of the binder resin used for the undercoat layer include a known polymer compound such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and a known material such as a silane coupling agent.

Examples of the binder resin used for the undercoat layer also include a charge-transporting resin having a charge-transporting group, and a conductive resin (for example, polyaniline or the like).

Among the above, as the binder resin used for the undercoat layer, for example, a resin insoluble in a coating solvent of an upper layer is suitable; and a resin obtained by a reaction between at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin, and a curing agent is particularly suitable.

In a case where these binder resins are used in combination of two or more kinds thereof, a mixing proportion thereof is set as necessary.

The undercoat layer may contain various additives for improving the electrical properties, the environmental stability, and the image quality.

Examples of the additive include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for the surface treatment of the inorganic particles as described above, but may be further added to the undercoat layer as the additive.

Examples of the silane coupling agent as the additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in a form of a mixture or a polycondensate of a plurality of compounds.

The undercoat layer may have, for example, a Vickers hardness of 35 or more.

For example, the surface roughness (ten-point average roughness) of the undercoat layer may be adjusted to ½ from 1/(4n) (n represents a refractive index of an upper layer) of a laser wavelength $\lambda$ for exposure to be used to suppress moire fringes.

Resin particles or the like may be added to the undercoat layer to adjust the surface roughness. Examples of the resin particles include silicone resin particles and crosslinked polymethyl methacrylate resin particles. In addition, the surface of the undercoat layer may be polished to adjust the surface roughness. Examples of a polishing method include buff polishing, a sandblast treatment, wet honing, and a grinding treatment.

The formation of the undercoat layer is not particularly limited, and a known forming method is used. For example, a coating film of a coating solution for forming the undercoat layer, in which the above-described components are added to a solvent, is formed, and the coating film is dried and then heated as necessary.

Examples of the solvent for preparing the coating solution for forming the undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of the solvent include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming the undercoat layer include known methods such as a roll mill, a ball mill, a vibration ball mill, an attritor, a sand mill, a colloid mill, and a paint shaker.

Examples of the method of coating the conductive substrate with the coating solution for forming the undercoat layer include typical coating methods such as a blade coating method, a wire bar coating method, a spray coating method, a dip coating method, a bead coating method, an air knife coating method, and a curtain coating method.

A film thickness of the undercoat layer is set to, for example, preferably 15 μm or more and more preferably in a range of 20 μm or more and 50 μm or less.

Interlayer

An interlayer may be further provided between the undercoat layer and the photosensitive layer.

The interlayer is, for example, a layer containing a resin. Examples of the resin used for the interlayer include polymer compounds such as an acetal resin (for example, polyvinyl butyral or the like), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, and a melamine resin.

The interlayer may be a layer containing an organometallic compound. Examples of the organometallic compound used for the interlayer include organometallic compounds containing a metal atom such as zirconium, titanium, aluminum, manganese, and silicon.

The compounds used for the interlayer may be used alone or in a form of a mixture or a polycondensate of a plurality of compounds.

Among the above, for example, it is preferable that the interlayer is a layer containing an organometallic compound containing a zirconium atom or a silicon atom.

The formation of the interlayer is not particularly limited, and a known forming method is used. For example, a coating film of a coating solution for forming the interlayer, in which the above-described components are added to a solvent, is formed, and the coating film is dried and then heated as necessary.

Examples of the coating method of forming the interlayer include typical methods such as a dip coating method, a push-up coating method, a wire bar coating method, a spray coating method, a blade coating method, an air knife coating method, and a curtain coating method.

A film thickness of the interlayer is set to, for example, preferably in a range of 0.1 μm or more and 3 μm or less. The interlayer may be used as the undercoat layer.

Charge Generation Layer

A charge generation layer is, for example, a layer containing a charge generation material and a binder resin. In addition, the charge generation layer may be a deposition layer of the charge generation material. The deposition layer of the charge generation material is, for example, appropriate in a case where an incoherent light source such as a light emitting diode (LED) or an organic electro-luminescence (EL) image array is used.

Examples of the charge generation material include an azo pigment such as a bisazo pigment and a trisazo pigment; a fused ring aromatic pigment such as dibromoanthanthrone; a perylene pigment; a pyrrolopyrrole pigment; a phthalocyanine pigment; zinc oxide; and trigonal selenium.

Among the above, for example, a metal phthalocyanine pigment or a metal-free phthalocyanine pigment is preferably used as the charge generation material, in order to deal with laser exposure in a near-infrared region. Specifically, for example, hydroxy gallium phthalocyanine, chlorogallium phthalocyanine, dichlorotin phthalocyanine, or titanyl phthalocyanine is more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near-ultraviolet region.

The above-described charge generation material may be used even in a case where a non-coherent light source such as an LED having a central wavelength of light emission in a range of 450 nm or more and 780 nm or less and an organic EL image array is used.

In a case where an n-type semiconductor such as a fused ring aromatic pigment, a perylene pigment, and an azo pigment is used as the charge generation material, a dark current is unlikely to be generated, and image defects referred to as black spots can be suppressed even in a case in which a thin film is used as the photosensitive layer. The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (polycondensate of bisphenols and aromatic divalent carboxylic acid, or the like), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" means that a volume resistivity is $1\times10^{13}$ Ω·cm or more.

The binder resins may be used alone or in a form of a mixture of two or more kinds thereof.

A blending ratio between the charge generation material and the binder resin is, for example, preferably in a range of 10:1 to 1:10 in terms of mass ratio.

The charge generation layer may also contain other known additives.

The formation of the charge generation layer is not particularly limited, and a known forming method is used. For example, a coating film of a coating solution for forming the charge generation layer, in which the above-described components are added to a solvent, is formed, and the coating film is dried and then heated as necessary. The charge generation layer may be formed by a vapor deposition of the charge generation material. For example, the formation of the charge generation layer by the vapor deposition is particularly preferable in a case where the fused ring aromatic pigment or the perylene pigment is used as the charge generation material.

Examples of the solvent for preparing the coating solution for forming the charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The solvents are used alone or in a form of a mixture of two or more kinds thereof.

As a method of dispersing particles (for example, the charge generation material) in the coating solution for forming the charge generation layer, for example, a media disperser such as a ball mill, a vibration ball mill, an attritor, a sand mill, and a horizontal sand mill, or a medialess disperser such as a stirrer, an ultrasonic disperser, a roll mill, and a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which a dispersion liquid is dispersed by causing the dispersion liquid to penetrate through a micro-flow path in a high-pressure state.

During the dispersion, it is effective to set an average particle diameter of the charge generation material in the coating solution for forming the charge generation layer to 0.5 μm or less, for example, preferably 0.3 μm or less and more preferably 0.15 μm or less.

Examples of the method of coating the undercoat layer (or the interlayer) with the coating solution for forming the charge generation layer include typical methods such as a blade coating method, a wire bar coating method, a spray coating method, a dip coating method, a bead coating method, an air knife coating method, and a curtain coating method.

A film thickness of the charge generation layer is set to, for example, preferably in a range of 0.1 μm or more and 5.0 μm or less and more preferably in a range of 0.2 μm or more and 2.0 μm or less.

Charge Transport Layer

A charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, and anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material also include a positive hole-transporting compound such as a triarylamine-based compound, a benzidine-based compound, an arylalkane-based compound, an aryl-substituted ethylene-based compound, a stilbene-based compound, an anthracene-based compound, and a hydrazone-based compound. The charge transport materials may be used alone or in combination of two or more kinds thereof, but are not limited thereto.

From the viewpoint of charge mobility, for example, a triarylamine derivative represented by Structural Formula (a-1) or a benzidine derivative represented by Structural Formula (a-2) is preferable as the charge transport material.

(a-1)

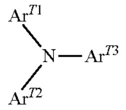

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

(a-2)

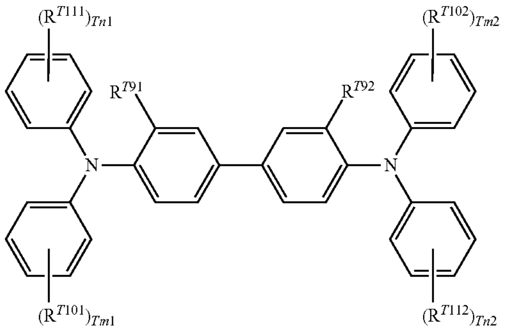

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, in which $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

Among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" or a benzidine derivative having "$—CH═CH—CH═C(R^{T15})(R^{T16})$" is particularly preferable from the viewpoint of the charge mobility.

As the polymer charge transport material, known materials having charge transport properties, such as poly-N-vinylcarbazole and polysilane, are used. In particular, for example, a polyester-based polymer charge transport material is particularly preferable. The polymer charge transport material may be used alone or in combination of the binder resin.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among the above, for example, a polycarbonate resin or a polyarylate resin is preferable as the binder resin. The binder resins may be used alone or in combination of two or more kinds thereof.

A blending ratio between the charge transport material and the binder resin is, for example, preferably 10:1 to 1:5 in terms of mass ratio.

The charge transport layer may also contain other known additives.

A known forming method is applied to the formation of the charge transport layer. For example, the charge transport layer is formed by forming a coating film of a coating solution for forming a charge transport layer, in which a material is added to a solvent, drying the coating film, and heating the coating film as necessary.

Examples of the solvent for preparing the coating solution for forming the charge transport layer include organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. The solvents are used alone or in a form of a mixture of two or more kinds thereof.

Examples of the coating method of coating the charge generation layer with the coating solution for forming the charge transport layer include methods such as a blade coating method, a wire bar coating method, a spray coating method, a dip coating method, a bead coating method, an air knife coating method, and a curtain coating method.

A film thickness of the charge transport layer is set to, for example, preferably in a range of 5 μm or more and 50 μm or less and more preferably in a range of 10 μm or more and 30 μm or less.

Single Layer-Type Photosensitive Layer

The single layer-type photosensitive layer is, for example, a layer containing a charge generation material, a charge transport material, and as necessary, a binder resin and other additives. The materials are the same as the materials described in the sections of the charge generation layer and the charge transport layer.

A content of the charge generation material in the single layer-type photosensitive layer may be, for example, 0.1% by mass or more and 10% by mass or less, preferably 0.8% by mass or more and 5% by mass or less with respect to the total solid content.

The content of the charge transport material in the single layer-type photosensitive layer may be, for example, 5% by mass or more and 50% by mass or less with respect to the total solid content.

A method of forming the single layer-type photosensitive layer is the same as the method of forming the charge generation layer or the charge transport layer.

A film thickness of the single layer-type photosensitive layer may be, for example, 5 μm or more and 50 μm or less, preferably 10 μm or more and 40 μm or less.

Cleaning Blade

The cleaning blade contains at least a polyurethane rubber that is obtained by polymerizing at least a polyol component and a polyisocyanate component, in at least a contact portion coming into contact with the photoreceptor (hereinafter, referred to as "contact portion") or a member constituting the contact portion (hereinafter, referred to as "contact member").

In the cleaning blade, the ratio M100/Re of the 100% modulus M100 (MPa) to the impact resilience coefficient Re (%) is 0.25 or more, the impact resilience coefficient Re is less than 25%, and the tensile stress with a 200% strain at a temperature of 23° C. is 15 MPa or more, in at least the contact portion or the contact member.

In the cleaning blade satisfying the above-described characteristics, by increasing the ratio M100/Re while reducing the impact resilience coefficient and increasing the tensile stress, pressure fluctuation (that is, the maximum pressure) of the blade is reduced, energy absorbing ability of the blade is improved, and the behavior of the blade is stabilized.

The ratio M100/Re of the contact portion or the contact member is 0.25 or more, for example, preferably 0.28 or more and more preferably 0.3 or more. From the viewpoint of abrasion resistance, the upper limit of the ratio M100/Re of the contact portion or the contact member is, for example, preferably 1.0 or less and more preferably 0.9 or less. The ratio M100/Re of the contact portion or the contact member is, for example, preferably 0.25 or more and 1.0 or less, more preferably 0.28 or more and 1.0 or less, and still more preferably 0.3 or more and 0.9 or less.

The impact resilience coefficient Re of the contact portion or the contact member is less than 25%, for example, preferably 22% or less and more preferably 20% or less. From the viewpoint of suppressing blade chattering and abrasion resistance, the lower limit of the impact resilience coefficient Re of the contact portion or the contact member is, for example, preferably 10% or more and more preferably 13% or more. The impact resilience coefficient Re of the contact portion or the contact member is, for example, preferably 10% or more and less than 25%, more preferably 10% or more and 22% or less, and still more preferably 13% or more and 20% or less.

From the viewpoint of satisfying the above-described characteristics, the 100% modulus M100 of the contact portion or the contact member is, for example, preferably 4 MPa or more and 10 MPa or less, and more preferably 5 MPa or more and 9 MPa or less.

The tensile stress of the contact portion or the contact member with a 200% strain at a temperature of 23° C. is 15 MPa or more, for example, preferably 21 MPa or more and more preferably 26 MPa or more. The upper limit of the tensile stress of the contact portion or the contact member is, for example, preferably 40 MPa or less and more preferably 35 MPa or less. The tensile stress of the contact portion or the contact member is, for example, preferably 15 MPa or more and 40 MPa or less, more preferably 21 MPa or more and 40 MPa or less, and still more preferably 26 MPa or more and 35 MPa or less.

The 100% modulus, the impact resilience coefficient, and the tensile stress of the contact portion or the contact member can be controlled by adjusting a content ratio between the hard segment and the soft segment contained in the polyurethane rubber by the type and used amount of each polymerization component of the polyurethane rubber and production conditions.

Hereinafter, the material and formulation of the contact portion or the contact member will be described.

A number-average molecular weight of the component of the polyurethane rubber is a value measured by gel permeation chromatography (GPC).

Polyurethane Rubber

The polyurethane rubber is polyurethane rubber obtained by polymerizing at least a polyol component and a polyisocyanate component. The polyurethane rubber may be a polyurethane rubber obtained by further polymerizing a resin having a functional group that reacts with an isocyanate group, as necessary.

Polyol Component

The polyol component includes a high-molecular-weight polyol and a low-molecular-weight polyol.

The high-molecular-weight polyol is a polyol having a number-average molecular weight of 500 or more (for example, preferably 500 or more and 5,000 or less). Examples of the high-molecular-weight polyol include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of a commercially available product of the high-molecular-weight polyol include PLACCEL 205 and PLACCEL 240 of Daicel Corporation. One kind of the high-molecular-weight polyol may be used alone, or two or more kinds thereof may be used in combination.

A polymerization ratio of the high-molecular-weight polyol may be, for example, 30 mol % or more and 50 mol % or less, and preferably 40 mol % or more and 50 mol % or less with respect to the total polymerization component of the polyurethane rubber.

The low-molecular-weight polyol is a polyol having a number-average molecular weight of less than 500. The low-molecular-weight polyol is a material that functions as a chain extender and a crosslinking agent.

Examples of the low-molecular-weight polyol include 1,4-butanediol. A proportion of the 1,4-butanediol is, for example, preferably more than 50 mol % and 75 mol % or less, more preferably 52 mol % or more and 75 mol % or less, still more preferably 55 mol % or more and 75 mol % or less, and even more preferably 55 mol % or more and 60 mol % or less with respect to all polyol components. The proportion of 1,4-butanediol in all low-molecular-weight polyols is, for example, preferably 80 mol % or more, more preferably 90 mol % or more, and still more preferably 100 mol %. For example, it is most preferable that all the low-molecular-weight polyols are 1,4-butanediol.

In addition to 1,4-butanediol, examples of the low-molecular-weight polyol include a diol (bifunctional), a triol (trifunctional), and a tetraol (tetrafunctional), that are known as a chain extender and a crosslinking agent. These polyols other than 1,4-butanediol may be used alone or in combination of two or more kinds thereof.

A polymerization ratio of the low-molecular-weight polyol may be, for example, more than 50 mol % and 75 mol % or less, and preferably 52 mol % or more and 75 mol % or less, more preferably 55 mol % or more and 75 mol % or less, and still more preferably 55 mol % or more and 60 mol % or less with respect to the total polymerization component of the polyurethane rubber.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3'-dimethylbiphenyl-4,4'-diisocyanate (TODI). The polyisocyanate component may be used alone or in combination of two or more kinds thereof.

As the polyisocyanate component, for example, 4,4'-diphenylmethane diisocyanate (MDI), 1,5-naphthalene diisocyanate (NDI), or hexamethylene diisocyanate (HDI) is preferable.

A polymerization ratio of the polyisocyanate component may be, for example, 5 mol % or more and 25 mol % or less, and preferably 10 mol % or more and 20 mol % or less with respect to the total polymerization component of the polyurethane rubber. In a case where the polymerization ratio of the polyisocyanate component is set to be in the above-described range, it is easy to set the 100% modulus, the impact resilience coefficient, and the tensile stress to be in the above-described ranges.

Resin Having Functional Group Reacting with Isocyanate Group (Functional Group-Containing Resin)

As a functional group-containing resin, for example, a flexible resin is preferable, and an aliphatic resin having a linear structure is more preferable. Specific examples of the functional group-containing resin include an acrylic resin having two or more hydroxyl groups, a polybutadiene resin having two or more hydroxyl groups, and an epoxy resin having two or more epoxy groups.

Examples of a commercially available product of the acrylic resin having two or more hydroxyl groups include ACTFLOW UMB-2005B, UMB-2005P, UMB-2005, and UME-2005 (Soken Chemical & Engineering Co., Ltd.).

Examples of a commercially available product of the polybutadiene resin having two or more hydroxyl groups include R-45HT (Idemitsu Kosan Co., Ltd.).

As the epoxy resin having two or more epoxy groups, for example, an epoxy resin that is more flexible and more robust than a general epoxy resin is preferable. For example, an epoxy resin having a flexible skeleton in the main chain structure is suitable, and examples of the flexible skeleton include an alkylene skeleton, a cycloalkane skeleton, and a polyoxyalkylene skeleton; and a polyoxyalkylene skeleton is particularly suitable. In addition, for example, an epoxy resin having a low viscosity with respect to a molecular weight is suitable. Specifically, for example, it is preferable that a weight-average molecular weight is in a range of 900±100 and a viscosity at a temperature of 25° C. is in a range of 15000±5000 mPa·s, more preferably in a range of 15000±3000 mPa·s. Examples of a commercially available product of the epoxy resin having the above-described characteristics include EPLICON EXA-4850-150 (DIC Corporation).

Crosslinking Density of Polyurethane Rubber

From the viewpoint of controlling the 100% modulus, the impact resilience coefficient, and the tensile stress within the above-described ranges, a crosslinking density of the polyurethane rubber is, for example, preferably $0.93\times10^{-3}$ mol/$m^3$ or more and $1.45\times10^{-3}$ mol/$m^3$ or less, more preferably $1.01\times10^{-3}$ mol/$m^3$ or more and $1.26\times10^{-3}$ mol/$m^3$ or less, and still more preferably $1.07\times10^{-3}$ mol/$m^3$ or more and $1.22\times10^{-3}$ mol/$m^3$ or less.

The crosslinking density of the polyurethane rubber is calculated according to the following expression.

$$\text{Expression: } n = E'/3RT$$

n: crosslinking density (mol/$m^3$)

E': flat region storage elastic modulus (dyne/$cm^2$)

R: gas constant (8.31 J/K·mol=N·m/k·mol=$10^7$ dyne·cm/k·mol)

T: absolute temperature (k) of parallel (storage) elastic modulus

1 Pa=9.8 (dyne/$cm^2$)

The storage elastic modulus is a characteristic consisting of dynamic viscoelasticity. In a case where a viscoelastic body is applied to a strain τ of a sinusoidal wave represented by τ=τo eiωt in a steady oscillation, the stress σ is represented by σ=σo ei(ωt+δ). In a case where a dynamic modulus of elasticity, that is, a complex modulus of elasticity is denoted by E*, E* is represented by E*=σ/τ=σ0/τ0·cos δ+i·σ0/τ0·sin δ=E'+iE". E' is the storage elastic modulus, E" is a loss elastic modulus, and a loss tangent tan δ=E"/E'. The dynamic viscoelastic characteristics are measured by a dynamic viscoelasticity measuring machine. The storage elastic modulus is measured using a thermal analysis system EXSTAR 6000 (Seiko Instruments Inc.) at 1 Hz.

Segment of Polyurethane Rubber

For example, the polyurethane rubber preferably includes a hard segment and a soft segment. An average diameter of aggregates of the hard segment is, for example, preferably 1 μm or more and 10 μm or less, and more preferably 1 μm or more and 5 μm or less.

The average diameter of the aggregates of the hard segments is measured by the following measuring method.

An image is captured at a magnification of 20 times using a polarizing microscope (BX51-P, Olympus Corporation), and the image is subjected to image processing to be binarized. Equivalent circle diameters of 20 cleaning blades, 5 points per cleaning blade, and 5 aggregates per point, that is, a total of 500 aggregates are measured, and the arithmetic mean of the total 500 equivalent circle diameters is calculated. The binarization of the image is carried out by adjusting threshold values of hue, chroma, and brightness using image processing software OLYMPUS Stream essentials (Olympus Corporation) such that the color of the aggregates in the crystal part and the hard segment is black and the color of the aggregates in the amorphous part (corresponding to the soft segment) is white.

Weight-Average Molecular Weight of Polyurethane Rubber

A weight-average molecular weight of the polyurethane rubber is, for example, preferably 1,000 or more and 4,000 or less, and more preferably 1,500 or more and 3,500 or less.

Method for Producing Polyurethane Rubber and Cleaning Blade

A general production method such as a prepolymer method and a one-shot method may be adopted to the production of the polyurethane rubber. The polyurethane rubber composition is formed into a sheet shape by centrifugal forming, extrusion forming, or the like, and the cleaning blade is produced by performing cutting processing or the like.

Examples of a catalyst used for producing the polyurethane rubber include an amine-based compound such as a tertiary amine, a quaternary ammonium salt, and an organometallic compound such as an organic tin compound. One kind of the catalyst may be used alone, or two or more kinds thereof may be used in combination.

Examples of the tertiary amine include trialkylamine such as triethylamine; tetraalkyl diamine such as N,N,N',N'-tetramethyl-1,3-butanediamine; aminoalcohol such as dimethylethanolamine; esteramine such as ethoxylated amine, ethoxylated diamine, and bis(diethylethanolamine) adipate; a cyclohexylamine derivative such as triethylenediamine (TEDA) and N,N-dimethylcyclohexylamine; a morpholine derivative such as N-methylmorpholine and N-(2-hydroxypropyl)-dimethylmorpholine; and a piperazine derivative such as N,N'-diethyl-2-methylpiperazine and N,N'-bis-(2-hydroxypropyl)-2-methylpiperazine.

Examples of the quaternary ammonium salt include 2-hydroxypropyltrimethylammonium octylate, 1,5-diazabicyclo[4.3.0]nonene-5 (DBN) octylate, 1,8-diazabicyclo[5.4.0]undecene-7 (DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate and dibutyltin di(2-ethylhexoate), stannous 2-ethylcaproate, and stannous oleate.

For example, from the viewpoint of hydrolytic resistance, triethylenediamine (TEDA) as a tertiary ammonium salt is preferable; and from the viewpoint of workability, a quaternary ammonium salt is preferable. Among the quaternary ammonium salts, 1,5-diazabicyclo[4.3.0]nonene-5 (DBN) octylate, 1,8-diazabicyclo[5.4.0]undecene-7 (DBU)-octylate, or DBU-formate, that has high reaction activity, is used.

The addition amount of the catalyst is, for example, preferably in a range of 0.0005% by mass or more and 0.03% by mass or less and particularly preferably 0.001% by mass or more and 0.01% by mass or less of the entire polyurethane rubber constituting the contact member.

Figure 5:
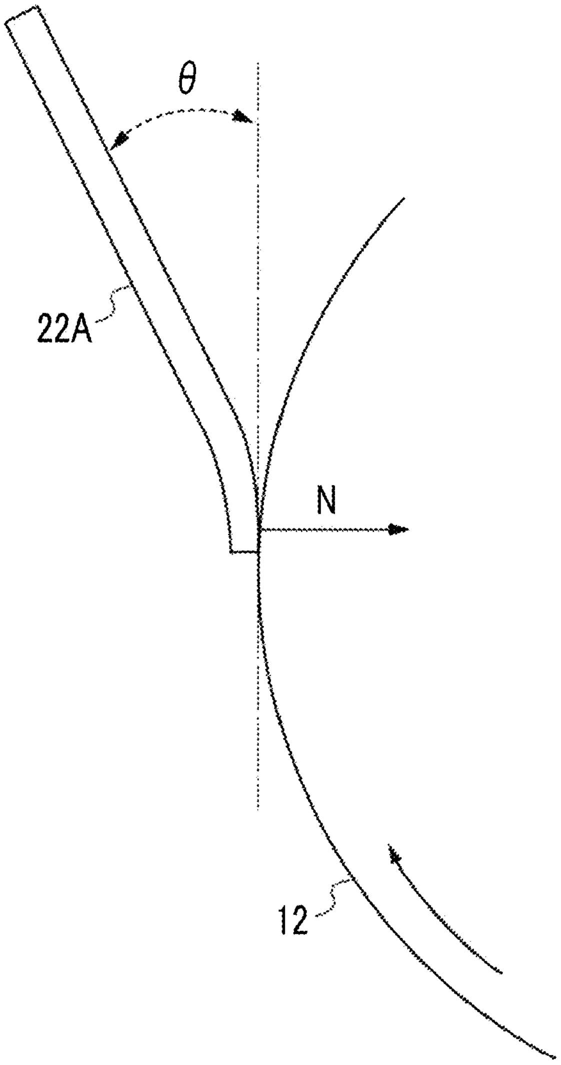
FIG. 5 is a schematic configuration view showing an example of a cleaning blade according to the present exemplary embodiment.

FIG. 5 is an example of an exemplary embodiment of the cleaning blade. As shown in FIG. 5, a tip of a cleaning blade 22A is directed to a direction facing a rotation direction (arrow direction) of a photoreceptor 12 and is in contact with the surface of the photoreceptor 12 in this state.

An angle θ between the cleaning blade 22A and the photoreceptor 12 is, for example, preferably 5° or more and 35° or less, and more preferably 10° or more and 25° or less. The angle θ refers to an angle formed by a tangent line (one-dot chain line in FIG. 5) in a contact portion between the tip of the cleaning blade 22A and the photoreceptor 12 and a non-deformable portion of the cleaning blade 22A.

A pressing pressure N of the cleaning blade 22A against the photoreceptor 12 is, for example, preferably 0.6 $gf/mm^2$ or more and 6.0 $gf/mm^2$ or less. The pressing pressure N is a pressure ($gf/mm^2$) with which the cleaning blade 22A is pressed toward the center of the photoreceptor 12 at a position where the cleaning blade 22A comes into contact with the photoreceptor 12.

The cleaning blade 22A is formed such that a support member (not shown in FIG. 3) is bonded to a surface side opposite to the surface in contact with the photoreceptor 12 and the cleaning blade is supported by the support member. The cleaning blade 22A is pressed against the photoreceptor 12 by a force from the support member. Examples of the support member include a metal member such as aluminum and stainless steel. An adhesive layer may be provided between the support member and the cleaning blade 22A.

In the cleaning blade 22A, the contact portion that comes into contact with the photoreceptor 12 is composed of a member containing the polyurethane rubber obtained by polymerizing at least a polyol component and a polyisocyanate component.

In at least the contact portion of the cleaning blade 22A, the ratio M100/Re of the 100% modulus M100 (MPa) to the impact resilience coefficient Re (%) is 0.25 or more, the impact resilience coefficient Re is less than 25%, and the tensile stress with a 200% strain at 23° C. is 15 MPa or more.

Examples

Hereinafter, the present exemplary embodiment will be specifically described based on Examples. However, the present exemplary embodiment is not limited to Examples. In the following description, unless otherwise specified, "parts" and "%" are based on mass. In the following description, the synthesis, the treatment, the production, the test, and the like are carried out at room temperature (25° C.±3° C.) unless otherwise specified.

Production of Cleaning Blade

A urethane rubber sheet material is poured into a mold to form a urethane rubber sheet, that is, a cleaning blade. A 100% modulus, an impact resilience coefficient, and a tensile stress of the urethane rubber sheet are controlled depending on the type and formulation of the material. Table 1 shows physical property values of the urethane rubber sheet.

TABLE 1

| Cleaning blade No. | 100% modulus M100 MPa | Impact resilience coefficient Re % | M100/Re — | Tensile stress MPa |
|---|---|---|---|---|
| (C1) | 4.4 | 21 | 0.21 | 19 |
| (1) | 7.1 | 21 | 0.34 | 19 |
| (C2) | 12.6 | 37 | 0.34 | 19 |
| (2) | 5.5 | 21 | 0.26 | 19 |
| (C3) | 7.1 | 21 | 0.34 | 11 |

Production of Photoreceptor

Photoreceptor (A-1)

Formation of Undercoat Layer 100 parts of zinc oxide (average particle size: 70 nm, specific surface area: 15 $m^2/g$, Tayca Corporation) is stirred and mixed with 500 parts of toluene, 1.3 parts of a silane coupling agent (trade name: KBM603, Shin-Etsu Chemical Co., Ltd., N-2-(aminoethyl)-3-aminopropyltrimethoxysilane) is added thereto, and the mixture is stirred for 2 hours. Next, the toluene is distilled off under reduced pressure and baked at 120° C. for 3 hours to obtain zinc oxide subjected to a surface treatment with the silane coupling agent.

110 parts of the surface-treated zinc oxide is stirred and mixed with 500 parts of tetrahydrofuran, a solution obtained by dissolving 0.6 parts of alizarin in 50 parts of tetrahydrofuran is added thereto, and the mixture is stirred at 50° C. for 5 hours. Next, the solid content is separated by filtration by carrying out filtration under reduced pressure, and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, Sumitomo Bayer Urethane Co., Ltd.), and 15 parts of a butyral resin (trade name: S-LEC BM-1, Sekisui Chemical Co., Ltd.) in 68 parts of methyl ethyl ketone is mixed with 5 parts of methyl ethyl ketone, and the mixture is dispersed in a sand mill for 2 hours using glass beads with a diameter of 1 mmφ, thereby obtaining a dispersion liquid. 0.005 parts of dioctyl tin dilaurate as a catalyst and 4 parts of silicone resin particles (trade name: TOSPEARL 145, Momentive Performance Materials Inc.) are added to the dispersion liquid to obtain a coating solution for forming an undercoat layer.

An outer peripheral surface of a conductive substrate (an aluminum cylindrical tube with an outer diameter of 30 mm, a length of 250 mm, and a thickness of 1 mm) is coated with the coating solution for forming an undercoat layer by a dip coating method, and dried and cured at 170° C. for 40 minutes, thereby forming an undercoat layer having a layer thickness of 20 μm.

Formation of Charge Generation Layer

A mixture of 15 parts of hydroxygallium phthalocyanine as a charge generation material (having diffraction peaks at positions where Bragg angles (2θ+0.2°) in the X-ray diffraction spectrum using CuKα characteristic X-rays are at least of 7.5°, 9.9°, 12.5, 16.3°, 18.6°, 25.1°, and) 28.3°, 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads with a diameter of 1 mm. 175 parts of n-butyl acetate and 180 parts of methyl ethyl ketone are added to the dispersion liquid, and the mixture is stirred to obtain a coating solution for forming a charge generation layer. The undercoat layer is dipped in and coated with the coating solution for forming a charge generation layer, and dried at room temperature to form a charge generation layer having a layer thickness of 0.25 μm.

Formation of Charge Transport Layer

Charge transport material: CTM-1 . . . 40 parts
Polyarylate resin: PA1 . . . 42 parts
Polycarbonate resin: PC1 . . . 18 parts
Solvent: tetrahydrofuran . . . 270 parts
Solvent: toluene . . . 30 parts The above-described materials are stirred and mixed to obtain a coating solution for forming a charge transport layer. The charge generation layer is dipped and coated with the coating solution for forming a charge transport layer, and dried at 150° C. for 30 minutes to form a charge transport layer having a layer thickness of 30 μm. Chemical structures of CTM-1, PA1, and PC1 are as follows.

CTM-1

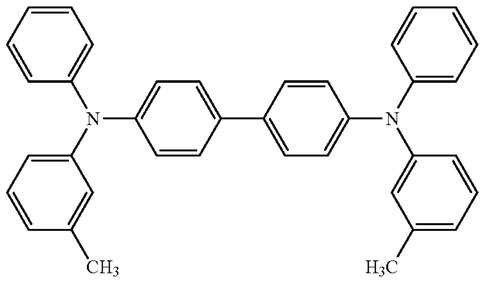

-continued

PA1

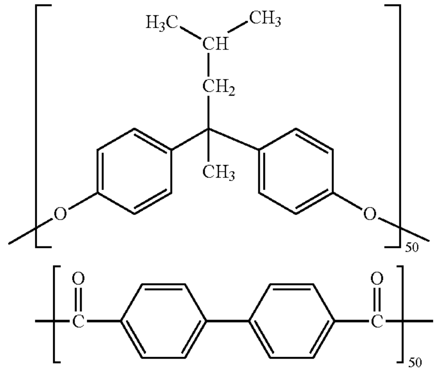

PC1

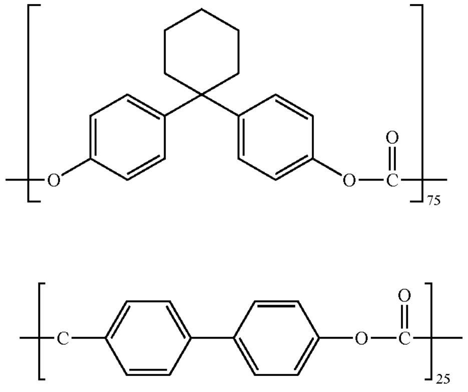

Formation of Surface Layer 60 parts of polytetrafluoroethylene particles (LUBRON L-2, Daikin Industries, Ltd.), 3 parts of a fluorine atom-containing resin (GF300, Toagosei Co., Ltd.), and 140 parts of cyclopentanol are mixed and dispersed with a super high-speed disperser to prepare a dispersion.

21 parts of a compound (1-1), 49 parts of a compound (2-15), and 1 part of a polymerization initiator (OTAZO-15, Otsuka Chemical Co., Ltd.) are dissolved in 80 parts of cyclopentanol, and mixed with 100 parts of the above-described dispersion to prepare a coating solution. The charge transport layer is dipped in and coated with the coating solution, dried with air at room temperature for 30 minutes, and then heated and cured at a temperature of 150° C. for 45 minutes in a nitrogen atmosphere with an oxygen concentration of 200 ppm, thereby forming a surface layer having a layer thickness of 15 μm. In this way, a photoreceptor (A-1) is obtained.

Chemical structures of the compound (1-1) and the compound (2-15) are as follows.

(1-1)

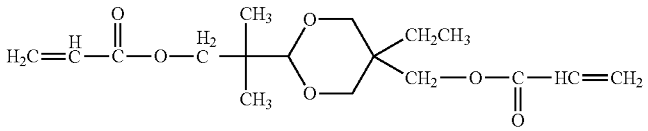

-continued (2-15)

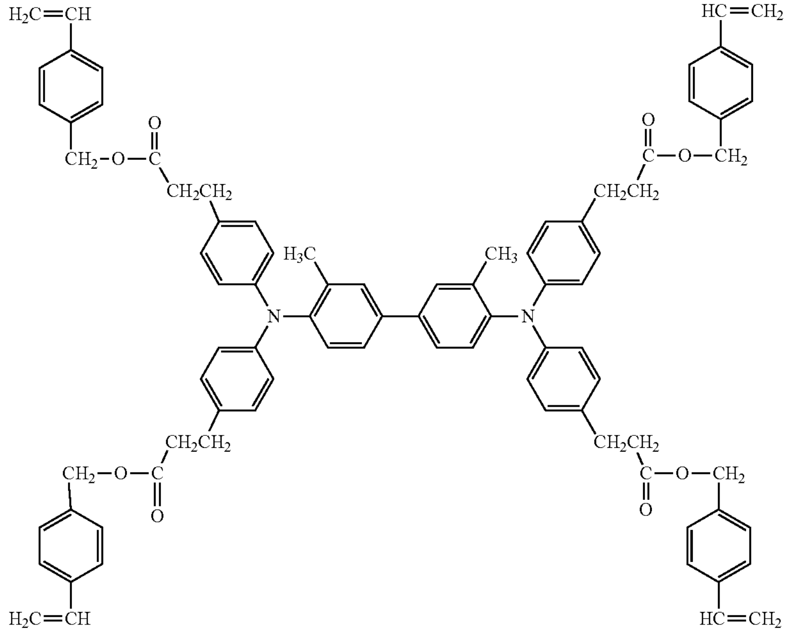

Photoreceptors (A-2) to (A-4)

Each photoreceptor is produced in the same manner as in the production of the photoreceptor (A-1), except that the specification of the surface layer is changed as shown in Table 2.

Photoreceptor (B-1)

Layers from the undercoat layer to the charge transport layer are formed on the conductive substrate in the same manner as in the production of the photoreceptor (A-1). The following surface layer is formed on the charge transport layer.

Formation of Surface Layer

| | |
|---|---|
| Radically polymerizable monomer having no charge transport function (caprolactone-modified dipentaerythritol hexaacrylate, KAYARAD DPCA-120, Nippon Kayaku Co., Ltd.) | 10 parts |
| Compound (6): radically polymerizable compound having charge transport function | 7 parts |
| Compound (7): diamine compound | 0.07 parts |
| Compound (8): oxazole compound | 0.21 parts |
| Alumina particles (AA05, Sumitomo Chemical Co., Ltd.) | 1.7 parts |
| Photopolymerization initiator (1-hydroxy-cyclohexyl-phenyl-ketone) (Irgacure 184, BASF Japan Ltd.) | 0.85 parts |
| Tetrahydrofuran | 100 parts |

The above-described materials are mixed to prepare a coating solution. The charge transport layer is coated with the coating solution by spray coating in a nitrogen stream, and allowed to stand in a nitrogen stream for 10 minutes to be air-dried.

Chemical structures of the compound (6), the compound (7), and the compound (8) are as follows.

(6)

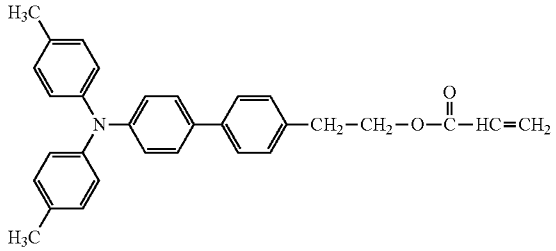

(7)

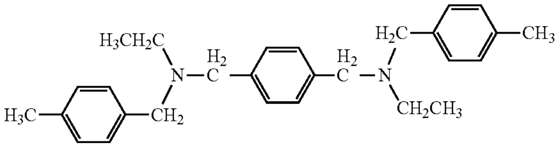

(8)

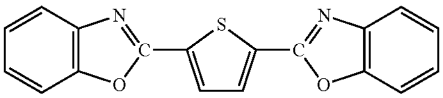

Next, ultraviolet irradiation is carried out under the following conditions in an ultraviolet irradiation booth in which the air is replaced with the nitrogen gas until the oxygen concentration is 2% or less.

Metal halide lamp: 160 W/cm

Irradiation distance: 120 mm

Irradiation intensity: 700 $mW/cm^2$

Irradiation time: 60 seconds

Next, the coating layer is dried at a temperature of 130° C. for 20 minutes to form a surface layer having a layer thickness of 5 μm. In this way, a photoreceptor (B-1) is obtained.

Photoreceptors (B-2) to (B-4)

Each photoreceptor is produced in the same manner as in the production of the photoreceptor (B-1), except that the specification of the surface layer is changed as shown in Table 3.

Photoreceptor (C-1)

Layers from the undercoat layer to the charge transport layer are formed on the conductive substrate in the same manner as in the production of the photoreceptor (A-1). The following surface layer is formed on the charge transport layer.

Formation of Surface Layer 200 parts of silica particles (number-average primary particle size: 20 nm), 10 parts of an electron transport compound ETM101, and 1,500 parts of 2-butanol are mixed and dispersed for 0.5 hours at a temperature of 35° C. and a circulation flow rate of 40 L/h using a circulation type ultrasonic homogenizer (RUS-600TCVP, manufactured by NIHONSEIKI KAISHA LTD., 19.5 kHz, 600 W). Next, the solution is passed through a filter having a pore diameter of 1 μm, and the 2-butanol is removed by distillation under reduced pressure. The obtained dried product is heated at a temperature of 120° C. for 2 hours, and baking of the electron transport compound is performed on the particles. Next, the product is pulverized with a pin mill to obtain inorganic particles (A) that have been subjected to a surface treatment with the electron transport compound.

A chemical structure of ETM101 is as follows.

ETM101

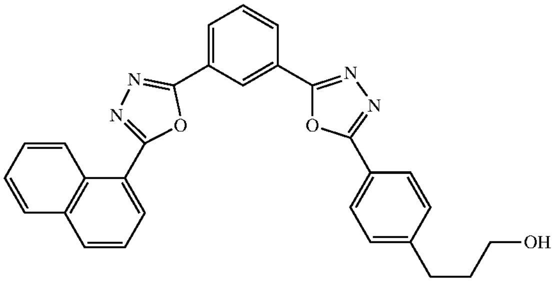

| | |
|---|---|
| Inorganic particles (A) | 68 parts |
| Compound M1: radically polymerizable monomer | 100 parts |
| Polymerization initiator: Irgacure 819 (BASF Japan Ltd.) | 10 parts |
| 2-Butanol | 230 parts |
| Tetrahydrofuran | 12 parts |

The above-described materials are stirred to prepare a coating solution. The charge transport layer is coated with the coating solution using a circular slide hopper coater. The coating layer is irradiated with ultraviolet rays using a xenon lamp at an illuminance of 16 mW/cm$^2$ for 1 minute, and then dried at a temperature of 80° C. for 70 minutes to form a surface layer having a layer thickness of 3 μm. In this way, a photoreceptor (C-1) is obtained.

A chemical structure of the compound M1 is as follows. R in the formula is an alkyl group.

M1

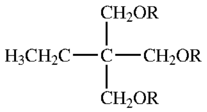

Photoreceptors (C-2) to (C-4)

Each photoreceptor is produced in the same manner as in the production of the photoreceptor (C-1), except that the specification of the surface layer is changed as shown in Table 4.

Production of Image Forming Apparatus

An electrophotographic image forming apparatus Apeos C2060 (FUJIFILM Business Innovation Corp.) is prepared, and the photoreceptor and the cleaning blade are mounted on the apparatus in the combination shown in Tables 2 to 4.

Using the image forming apparatus, for 100,000 sheets in a row, a halftone image with a density of 50% is output to half of an image forming range of A4 plain paper, and a halftone image with a density of 30% is output to the other half of the image forming range of A4 plain paper in an environment of a temperature of 25° C. and a relative humidity of 50%.

Performance Evaluation

Suppression of Fluctuation in Image Density

Using a reflection densitometer X-Rite 404 (X-RITE), L* values, a* values, and b* values at three locations are measured in each of halftone images with a density of 30% on the 100th, 10,000th, and 100,000th sheets. Based on the following expression, a color difference ΔE between the 100th and 10,000th sheets and a color difference ΔE between the 100th and 100,000th sheets are calculated, and the color difference ΔE is classified as follows. The results are shown in Tables 2 to 4.

$$\Delta E = \sqrt{(L_1 - L_2)^2 + (a_1 - a_2)^2 + (b_1 - b_2)^2}$$

In the expression, $L_1$, $a_1$, and $b_1$ are the L' value, a* value, and b* value (each of which is an average value of the three locations) of the 100th image; and $L_2$, $a_2$, and $b_2$ are the L* value, a* value, and b* value (each of which is an average value of the three locations) of the 10,000th image or the 100,000th image.

A: color difference ΔE is 1 or less

B: color difference ΔE is more than 1 and 5 or less

C: color difference ΔE is more than 5

Streak-Like Image Defect 10 sheets from the 91st sheet to the 100th sheet are visually observed, and a degree of streak-like image defects is classified as follows. The results are shown in Tables 2 to 4.

A: no streak-like image defects are observed in all of the 10 sheets, and no streak-like image defects are observed in the image with a density of 50% and the image with a density of 30%.

B: no streak-like image defects are observed in all of the 10 sheets, and no streak-like image defects are observed in the image with a density of 50%; slight streak-like image defects are observed in 1 to 5 sheets of the image with a density of 30%.

C: slight streak-like image defects are observed in both the image with a density of 50% and the image with a density of 30%.

TABLE 2

| | Photoreceptor | | | | | Performance | | |
|---|---|---|---|---|---|---|---|---|
| | | Surface layer | | | | Suppression of fluctuation in image density | | |
| | | Filler particles | | | Cleaning | 100th → | 10,000th → | Streak-like |
| | No. — | Type | % by mass | Transmittance % | blade No. | 10,000th — | 100,000th — | image defect — |
| Comparative Example A1 | A-4 | — | 0 | 99 | (C1) | C | C | C |
| Comparative Example A2 | A-4 | — | 0 | 99 | (1) | C | C | A |
| Comparative Example A3 | A-4 | — | 0 | 99 | (2) | C | C | B |
| Comparative Example A4 | A-4 | — | 0 | 99 | (C2) | C | C | C |
| Comparative Example A5 | A-4 | — | 0 | 99 | (C3) | C | C | C |
| Comparative Example A6 | A-1 | PTFE | 5 | 95 | (C1) | A | B | C |
| Example A1 | A-1 | PTFE | 5 | 95 | (1) | A | B | A |
| Example A2 | A-1 | PTFE | 5 | 95 | (2) | A | B | B |
| Comparative Example A7 | A-1 | PTFE | 5 | 95 | (C2) | A | B | C |
| Comparative Example A8 | A-1 | PTFE | 5 | 95 | (C3) | A | B | C |
| Comparative Example A9 | A-2 | PTFE | 10 | 87 | (C1) | A | A | C |
| Example A3 | A-2 | PTFE | 10 | 87 | (1) | A | A | A |
| Example A4 | A-2 | PTFE | 10 | 87 | (2) | A | A | B |
| Comparative Example A10 | A-2 | PTFE | 10 | 87 | (C2) | A | A | C |
| Comparative Example A11 | A-2 | PTFE | 10 | 87 | (C3) | A | A | C |
| Comparative Example A12 | A-3 | PTFE | 15 | 70 | (C1) | A | A | C |
| Example A5 | A-3 | PTFE | 15 | 70 | (1) | A | A | A |
| Example A6 | A-3 | PTFE | 15 | 70 | (2) | A | A | B |
| Comparative Example A13 | A-3 | PTFE | 15 | 70 | (C2) | A | A | C |
| Comparative Example A14 | A-3 | PTFE | 15 | 70 | (C3) | A | A | C |

TABLE 3

| | Photoreceptor | | | | | Performance | | |
|---|---|---|---|---|---|---|---|---|
| | | Surface layer | | | | Suppression of fluctuation in image density | | |
| | | Filler particles | | | Cleaning | 100th → | 10,000th → | Streak-like |
| | No. — | Type | % by mass | Transmittance % | blade No. | 10,000th — | 100,000th — | image defect — |
| Comparative Example B1 | B-4 | — | 0 | 99 | (C1) | C | C | C |
| Comparative Example B2 | B-4 | — | 0 | 99 | (1) | C | C | A |
| Comparative Example B3 | B-4 | — | 0 | 99 | (2) | C | C | B |
| Comparative Example B4 | B-4 | — | 0 | 99 | (C2) | C | C | C |

TABLE 3-continued

| | Photoreceptor | | | | | Performance | | |
|---|---|---|---|---|---|---|---|---|
| | | Surface layer | | | | Suppression of fluctuation in image density | | |
| | | Filler particles | | | Cleaning | 100th → | 10,000th → | Streak-like |
| | No. — | Type | % by mass | Transmittance % | blade No. | 10,000th — | 100,000th — | image defect — |
| Comparative Example B5 | B-4 | — | 0 | 99 | (C3) | C | C | C |
| Comparative Example B6 | B-1 | | 1.7 | 95 | (C1) | A | B | C |
| Example B1 | B-1 | | 1.7 | 95 | (1) | A | B | A |
| Example B2 | B-1 | | 1.7 | 95 | (2) | A | B | B |
| Comparative Example B7 | B-1 | | 1.7 | 95 | (C2) | A | B | C |
| Comparative Example B8 | B-1 | | 1.7 | 95 | (C3) | A | B | C |
| Comparative Example B9 | B-2 | | 2.5 | 91 | (C1) | A | B | C |
| Example B3 | B-2 | | 2.5 | 91 | (1) | A | B | A |
| Example B4 | B-2 | | 2.5 | 91 | (2) | A | B | B |
| Comparative Example B10 | B-2 | | 2.5 | 91 | (C2) | A | B | C |
| Comparative Example B11 | B-2 | | 2.5 | 91 | (C3) | A | B | C |
| Comparative Example B12 | B-3 | | 3.6 | 88 | (C1) | A | A | C |
| Example B5 | B-3 | | 3.6 | 88 | (1) | A | A | A |
| Example B6 | B-3 | | 3.6 | 88 | (2) | A | A | B |
| Comparative Example B13 | B-3 | | 3.6 | 88 | (C2) | A | A | C |
| Comparative Example B14 | B-3 | | 3.6 | 88 | (C3) | A | A | C |

TABLE 4

| | Photoreceptor | | | | | Performance | | |
|---|---|---|---|---|---|---|---|---|
| | | Surface layer | | | | Suppression of fluctuation in image density | | |
| | | Filler particles | | | Cleaning | 100th → | 10,000th → | Streak-like |
| | No. — | Type | % by mass | Transmittance % | blade No. | 10,000th — | 100,000th — | image defect — |
| Comparative Example C1 | C-4 | — | 0 | 99 | (C1) | C | C | C |
| Comparative Example C2 | C-4 | — | 0 | 99 | (1) | C | C | A |
| Comparative Example C3 | C-4 | — | 0 | 99 | (2) | C | C | B |
| Comparative Example C4 | C-4 | — | 0 | 99 | (C2) | C | C | C |
| Comparative Example C5 | C-4 | — | 0 | 99 | (C3) | C | C | C |
| Comparative Example C6 | C-1 | | 68 | 65 | (C1) | A | B | C |
| Example C1 | C-1 | | 68 | 65 | (1) | A | B | A |
| Example C2 | C-1 | | 68 | 65 | (2) | A | B | B |
| Comparative Example C7 | C-1 | | 68 | 65 | (C2) | A | B | C |
| Comparative Example C8 | C-1 | | 68 | 65 | (C3) | A | B | C |
| Comparative Example C9 | C-2 | | 75 | 42 | (C1) | A | B | C |
| Example C3 | C-2 | | 75 | 42 | (1) | A | B | A |
| Example C4 | C-2 | | 75 | 42 | (2) | A | B | B |
| Comparative Example C10 | C-2 | | 75 | 42 | (C2) | A | B | C |
| Comparative Example C11 | C-2 | | 75 | 42 | (C3) | A | B | C |

TABLE 4-continued

| | Photoreceptor | | | | | Performance | | |
|---|---|---|---|---|---|---|---|---|
| | | Surface layer | | | | Suppression of fluctuation in image density | | |
| | | Filler particles | | | | | | |
| | No. — | Type | % by mass | Transmittance % | Cleaning blade No. | 100th → 10,000th — | 10,000th → 100,000th — | Streak-like image defect — |
| Comparative Example C12 | C-3 | | 81 | 29 | (C1) | A | A | C |
| Example C5 | C-3 | | 81 | 29 | (1) | A | A | A |
| Example C6 | C-3 | | 81 | 29 | (2) | A | A | B |
| Comparative Example C13 | C-3 | | 81 | 29 | (C2) | A | A | C |
| Comparative Example C14 | C-3 | | 81 | 29 | (C3) | A | A | C |

The image forming apparatus according to the present disclosure includes the following aspects.

Supplementary Notes (((1)))

An image forming apparatus comprising:

a photoreceptor that has a surface layer in which a transmittance of light having a wavelength of 1,000 nm is 5% or more and 95% or less;

a charging device that charges a surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image;

a transfer device that transfers the toner image to a surface of a recording medium; and a photoreceptor cleaning device that has a cleaning blade coming into contact with the surface of the photoreceptor to clean the surface of the photoreceptor, wherein a contact portion of the cleaning blade coming into contact with the photoreceptor contains a polyurethane rubber that is obtained by polymerizing at least a polyol component and a polyisocyanate component, a ratio M100/Re of a 100% modulus M100 (MPa) to an impact resilience coefficient Re (%) is 0.25 or more, the impact resilience coefficient Re is less than 25%, and a tensile stress with a 200% strain at a temperature of 23° C. is 15 MPa or more.

(((2)))

The image forming apparatus according to (((1))), wherein the ratio M100/Re is 0.28 or more and 1.0 or less.

(((3)))

The image forming apparatus according to (((1))) or (((2))), wherein the cleaning blade is a laminate of the polyurethane rubber.

(((4)))

The image forming apparatus according to any one of (((1))) to (((3))), wherein the surface layer of the photoreceptor contains at least one filler particle selected from the group consisting of organic particles and inorganic particles.

(((5)))

The image forming apparatus according to any one of (((1))) to (((4))), wherein the surface layer of the photoreceptor is a layer that is obtained by curing a composition containing a monomer having a polymerizable functional group and fluororesin particles.

(((6)))

The image forming apparatus according to any one of (((1))) to (((4))), wherein the surface layer of the photoreceptor is a layer that is obtained by curing a composition containing an ultraviolet curable acrylic resin and at least one particle selected from the group consisting of metal oxide particles and silica particles.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a photoreceptor that has a surface layer in which a transmittance of light having a wavelength of 1,000 nm is 5% or more and 95% or less;

a charging device that charges a surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image;

a transfer device that transfers the toner image to a surface of a recording medium; and a photoreceptor cleaning device that has a cleaning blade coming into contact with the surface of the photoreceptor to clean the surface of the photoreceptor, wherein a contact portion of the cleaning blade coming into contact with the photoreceptor contains a polyurethane rubber that is obtained by polymerizing at least a polyol component and a polyisocyanate component, a ratio M100/Re of a 100% modulus M100 (MPa) to an impact resilience coefficient Re (%) is 0.25 or more, the impact resilience coefficient Re is less than 25%, and a tensile stress with a 200% strain at a temperature of 23° C. is 15 MPa or more.

2. The image forming apparatus according to claim 1, wherein the ratio M100/Re is 0.28 or more and 1.0 or less.

3. The image forming apparatus according to claim 1, wherein the cleaning blade is a laminate of the polyurethane rubber.

4. The image forming apparatus according to claim 1, wherein the surface layer of the photoreceptor contains at least one filler particle selected from the group consisting of organic particles and inorganic particles.

5. The image forming apparatus according to claim 1, wherein the surface layer of the photoreceptor is a layer that is obtained by curing a composition containing a monomer having a polymerizable functional group and fluororesin particles.

6. The image forming apparatus according to claim 2, wherein the surface layer of the photoreceptor is a layer that is obtained by curing a composition containing a monomer having a polymerizable functional group and fluororesin particles.

7. The image forming apparatus according to claim 3, wherein the surface layer of the photoreceptor is a layer that is obtained by curing a composition containing a monomer having a polymerizable functional group and fluororesin particles.

8. The image forming apparatus according to claim 4, wherein the surface layer of the photoreceptor is a layer that is obtained by curing a composition containing a monomer having a polymerizable functional group and fluororesin particles.

9. The image forming apparatus according to claim 1, wherein the surface layer of the photoreceptor is a layer that is obtained by curing a composition containing an ultraviolet curable acrylic resin and at least one particle selected from the group consisting of metal oxide particles and silica particles.

10. The image forming apparatus according to claim 2, wherein the surface layer of the photoreceptor is a layer that is obtained by curing a composition containing an ultraviolet curable acrylic resin and at least one particle selected from the group consisting of metal oxide particles and silica particles.

11. The image forming apparatus according to claim 3, wherein the surface layer of the photoreceptor is a layer that is obtained by curing a composition containing an ultraviolet curable acrylic resin and at least one particle selected from the group consisting of metal oxide particles and silica particles.

12. The image forming apparatus according to claim 4, wherein the surface layer of the photoreceptor is a layer that is obtained by curing a composition containing an ultraviolet curable acrylic resin and at least one particle selected from the group consisting of metal oxide particles and silica particles.

* * * * *